United States Patent
Beck et al.

(10) Patent No.: US 9,644,710 B2
(45) Date of Patent: May 9, 2017

(54) TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Martin Brehmer, Tettnang (DE); Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/799,812

(22) Filed: Jul. 15, 2015

(65) Prior Publication Data
US 2016/0017960 A1    Jan. 21, 2016

(30) Foreign Application Priority Data
Jul. 15, 2014    (DE) .................. 10 2014 213 690

(51) Int. Cl.
*F16H 3/66* (2006.01)
*F16H 3/44* (2006.01)

(52) U.S. Cl.
CPC ............ *F16H 3/66* (2013.01); *F16H 3/666* (2013.01); *F16H 2003/442* (2013.01); *F16H 2200/0069* (2013.01); *F16H 2200/0073* (2013.01); *F16H 2200/2012* (2013.01); *F16H 2200/2043* (2013.01); *F16H 2200/2046* (2013.01); *F16H 2200/2048* (2013.01); *F16H 2200/2097* (2013.01)

(58) Field of Classification Search
None
See application file for complete search history.

(56) References Cited

U.S. PATENT DOCUMENTS

| 7,824,302 B2 | 11/2010 | Diosi et al. |
| 8,133,148 B2 | 3/2012 | Wittkopp et al. |
| 8,858,387 B2 | 10/2014 | Haupt et al. |

OTHER PUBLICATIONS

German Patent Office Search Report, Feb. 18, 2015.

*Primary Examiner* — Colby M Hansen
(74) *Attorney, Agent, or Firm* — Dority & Manning, P.A.

(57) ABSTRACT

A transmission (G) is provided with four planetary gear sets (P1, P2, P3, P4), several shafts (W1-W7) and a first, second, third, fourth and fifth shift element (B1, B2, K1, K2, K3), the selective meshing of which brings about different transmission ratio relationships between a transmission input shaft (GW1) and a transmission output shaft (GW2). The transmission (G) includes a sixth shift element (K4), through which the fifth shaft (W5) is connectable to the sun gear (So-P4) of the fourth planetary gear set (P4), either directly or through the second shift element (B2), and whereas the fourth shaft (W4) is connectable through the fourth shift element (K2) with the sun gear (So-P4) of the fourth planetary gear set (P4), either directly or through the second shift element (B2).

19 Claims, 12 Drawing Sheets

|     | B1 | B2 | K1 | K2 | K3 | K4 |
|-----|----|----|----|----|----|----|
| 1   | X  | X  | X  |    |    | X  |
| 2   | X  | X  | X  | X  |    |    |
| 3   | X  | X  |    | X  |    | X  |
| 4   |    | X  | X  | X  |    | X  |
| 5   |    | X  |    | X  | X  | X  |
| 6   |    | X  | X  | X  | X  |    |
| 7   |    | X  | X  |    | X  | X  |
| 8   |    |    | X  | X  | X  | X  |
| 9.1 | X  |    | X  | X  | X  |    |
| 9.2 | X  |    | X  |    | X  | X  |
| 10  | X  |    |    | X  | X  | X  |
| R   | X  | X  |    |    | X  | X  |

|       | B1 | B2 | K1 | K2 | K3 | K4 | K5 |
|-------|----|----|----|----|----|----|----|
| 21    | X  | X  |    |    |    | X  | X  |
| 22    | X  | X  | X  |    |    | X  |    |
| 23    | X  | X  | X  | X  |    |    |    |
| 24    | X  | X  |    | X  |    | X  |    |
| 25    |    | X  | X  | X  |    | X  |    |
| 26    |    | X  |    | X  | X  | X  |    |
| 27    |    | X  | X  | X  | X  |    |    |
| 28    |    | X  | X  |    | X  | X  |    |
| 29    |    |    | X  | X  | X  | X  |    |
| 210.1 | X  |    | X  | X  | X  |    |    |
| 210.2 | X  |    | X  |    | X  | X  |    |
| 211   | X  |    |    | X  | X  | X  |    |
| 2R    | X  | X  |    |    | X  | X  |    |

Fig. 12

TRANSMISSION

FIELD OF THE INVENTION

The invention relates to a transmission with four planetary gear sets, several shafts and a first, second, third, fourth and fifth shift element, the selective engagement of which brings about different transmission ratio relationships between a transmission input shaft and a transmission output shaft. A first shaft is constantly connected to the transmission input shaft and to a carrier of the third planetary gear set. A second shaft is constantly connected to the transmission output shaft and to a carrier of the first planetary gear set. A third shaft is constantly connected to a sun gear of the third planetary gear set and can be fixed in a torque-proof manner through the first shift element. A fourth shaft is constantly connected to a carrier of the second planetary gear set. A fifth shaft is constantly connected to a ring gear of the second planetary gear set. A sixth shaft is constantly connected to a ring gear of the first planetary gear set. A ring gear of the third planetary gear set is constantly connected to a sun gear of the second planetary gear set. The first shaft is connectable through the third shift element with the fifth shaft. The second shaft is connectable through the fifth shift element with the fourth shaft. Through engagement of the second shift element, turning moment is transferable between the elements of sun gear, carrier and ring gear of the fourth planetary gear set.

BACKGROUND

Transmissions are primarily used in motor vehicles to adjust the rotational speed and turning moment of the drive unit of the vehicle.

A multi-stage transmission with eight forward gears is known from the patent application DE 10 2005 014 592 A1 of the applicant, incorporated herein by reference.

SUMMARY OF THE INVENTION

A task of this invention is to develop a transmission with ten forward gears. An additional task of this invention is to provide alternative embodiments of the transmission. Additional objects and advantages of the invention will be set forth in part in the following description, or may be obvious from the description, or may be learned through practice of the invention.

The tasks are solved by the characteristics of transmission embodiments set forth herein.

In accordance with the invention, a sixth shift element is provided. Through this sixth shift element, a fifth shaft is connectable to a sun gear of a fourth a gear set, either directly or through a second shift element. In addition, a fourth shaft is connectable through a fourth shift element with the sun gear of the fourth planetary gear set, either directly or through the second shift element.

The fifth shaft is directly connectable through the sixth shift element to the sun gear of the fourth planetary gear set. Upon a locked sixth shift element, there is a torque-proof connection between the sun gear of the fourth planetary gear set and the fifth shaft. In the same manner, the fourth shaft is directly connectable to the sun gear of the fourth planetary gear set through the fourth shift element.

However, the connection between the fourth or fifth shaft to the sun gear of the fourth planetary gear set may also be realized through the engagement of two shift elements arranged in series. Thereby, the fifth shaft may be connectable through the engagement of the sixth shift element and the second shift element with the sun gear of the fourth planetary gear set. The second and sixth shift elements are arranged in series with each other in the power flow. In the same manner, the fourth shaft may be connectable, through the engagement of the fourth shift element and the second shift element with the sun gear of the fourth planetary gear set.

Thereby, compared to the transmission known in the state of the art, three additional forward gears are realized. The first additional forward gear is arranged in the transmission ratio sequence between the original first and second forward gears. The second additional gear is arranged between the original fourth and fifth forward gears. The third additional gear features a transmission ratio between the transmission input shaft and the transmission output shaft that is the same as the original seventh gear. By increasing the number of gears, the transmission can be better adjusted to a fuel-consumption map of an internal combustion engine in a motor vehicle that is in operative drive connection with the transmission input shaft. Thereby, the fuel consumption of the vehicle can be reduced.

Through the engagement of the second shift element, the fourth planetary gear set is incorporated in the power flow of the transmission. This functionality can be achieved by multiple, functionally equivalent embodiments, which are described below.

According to a first embodiment, with a planetary gear set formed as a negative gear set, its carrier is constantly connected to a sixth shaft and its ring gear can be fixed in a torque-proof manner through the second shift element. If the fourth planetary gear set is formed as a positive gear set, its ring gear is connected to the sixth shaft, and its carrier can be fixed in a torque-proof manner through the second shift element. In this first embodiment, a sun gear of the first planetary gear set is constantly connected to a third shaft. Through the sixth shift element and the fourth shaft, the fifth shaft is directly connectable to the sun gear of the fourth planetary gear set through the fourth shift element.

According to a second embodiment, with a planetary gear set formed as a negative gear set, its carrier is connectable to the sixth shaft through the second shift element, and its ring gear is constantly fixed in a torque-proof manner. If the fourth planetary gear set is formed as a positive gear set, its ring gear is connectable to the sixth shaft through the second shift element, and its carrier is constantly fixed in a torque-proof manner. As in the first embodiment, the sun gear of the first planetary gear set is constantly connected to the third shaft and, through the sixth shift element and the fourth shaft, the fifth shaft is directly connectable to sun gear of the fourth planetary gear set through the fourth shift element. In particular, the arrangement with a constantly torque-proof ring gear of the fourth planetary gear set simplifies the structure of the transmission, since a radial and axial swivel bearing of the ring gear that is otherwise necessary is eliminated.

According to a third embodiment, the fifth shaft is connectable to the sun gear of the fourth planetary gear set through the engagement of the second shift element and the sixth shift element. The second and sixth shift elements are arranged in a series with each other in the power flow. The fourth shaft is connectable to the sun gear of the fourth planetary gear set through the engagement of the second shift element and the fourth shift element. The second and fourth shift elements are arranged in a series with each other in the power flow. In this third embodiment, the sun gear of the first planetary gear set is constantly connected to the third shaft. With a fourth planetary gear set formed as a negative gear set, its carrier is constantly connected to the sixth shaft, and its ring gear is constantly fixed in a torque-proof manner. With a fourth planetary gear set formed as a positive gear set, its ring gear is constantly connected to the sixth shaft, and the carrier is constantly fixed in a torque-proof manner. Through the connection of the second shift element to the sun gear, the load of the second shift element is reduced compared to a carrier connection, since, at the carrier of a planetary gear set formed as a negative gear set, as a sum shaft, there is an application of a turning moment that is higher than that at the ring gear or sun gear, which form differential shafts. Given the smaller load, the second shift element may be designed to be smaller and lighter. In addition, all shift elements up to the fifth shift element can be easily grouped together in terms of space. Through a corresponding modular design of the shift elements, the structure of the transmission can be simplified.

According to a fourth embodiment, the sun gear of the first planetary gear set is connectable to the third shaft through the second shift element. In this fourth embodiment, with a planetary gear set formed as a negative gear set, its carrier is constantly connected to the sixth shaft, and its ring gear is constantly fixed in a torque-proof manner. If the fourth planetary gear set is formed as a positive gear set, its ring gear is constantly connected to the sixth shaft, and its carrier is constantly fixed in a torque-proof manner. Through the sixth shift element and the fourth shaft, the fifth shaft is connectable directly to the sun gear of the fourth planetary gear set through the fourth shift element. Since, even with this fourth embodiment, the second shift element is connected to a sun gear, the load of the second shift element can be reduced in the same manner as in the third embodiment.

The transmission according to the first through fourth embodiments features ten forward gears and one reverse gear. The first forward gear is formed through the engagement of the first shift element, the second shift element, the third shift element and the sixth shift element. The second forward gear is formed through the engagement of the first shift element, the second shift element, the third shift element and the fourth shift element. The third forward gear is formed through the engagement of the first shift element, the second shift element, the fourth shift element and the sixth shift element. The fourth forward gear is formed through the engagement of the second shift element, the third shift element, the fourth shift element and the sixth shift element. The fifth forward gear is formed through the engagement of the second shift element, the fourth shift element, the fifth shift element and the sixth shift element. The sixth forward gear is formed through the engagement of the second shift element, the third shift element, the fourth shift element and the fifth shift element. The seventh forward gear is formed through the engagement of the second shift element, the third shift element, the fifth shift element and the sixth shift element. The eighth forward gear is formed through the engagement of the third shift element, the fourth shift element, the fifth shift element and the sixth shift element. The ninth forward gear is formed either through the engagement of the first shift element, the third shift element, the fourth shift element and the fifth shift element, or through the engagement of the first shift element, the third shift element, the fifth shift element and the sixth shift element. The tenth forward gear is formed through the engagement of the first shift element, the fourth shift element, the fifth shift element and the sixth shift element. The reverse gear is formed through the engagement of the first shift element, the second shift element, the fifth shift element and the sixth shift element.

In accordance with one arrangement of the invention, the transmission features a seventh shift element. Through the seventh shift element, the first shaft is connectable to the fourth shaft. Thereby, the transmission receives one additional gear, and thus features, as a whole, eleven forward gears. Thereby, the additional gear is characterized by a high transmission ratio between the transmission input shaft and the transmission output shaft. In other words, through the addition of the seventh shift element, the transmission receives a first gear with a particularly high transmission ratio, which increases the spread of the transmission. This first gear with a high transmission ratio is realized through the engagement of the first, second, sixth and seventh shift elements. In all other gears, the seventh shift element is open. The formation of the remaining ten forward gears takes place analogously to the transmission with nine forward gears described above, such that the formation of the first to tenth forward gears of the ten-gear transmission corresponds to the formation of the second to eleventh forward gears of the eleven-gear transmission, whereas the seventh shift element in the second to eleventh forward gears is open.

Preferably, the seventh shift element does not have a continuously variable capability of transferring turning moment. For example, the seventh shift element is formed as a claw shift element or a synchronization. Since the seventh shift element is open up to the first forward gear in all additional ten forward gears, in this manner, compared to frictional shift elements, the drag losses can be reduced with a variable turning moment transmission rate.

In each gear of the transmission, four of the six (or seven) shift elements are locked, by which the degree of efficiency of the transmission, as a result of drag losses, is not impaired because of the at least one additional shift element. This is particularly true if the seventh shift element is formed as a claw shift element.

Preferably, the second shift element does not feature a continuously variable capability of transferring turning moment. For example, the second shift element is formed as a claw shift element or a synchronization. Since the second shift element opens only from the seventh to the eighth forward gear or, with the eleven-gear transmission described above, only from the eighth to ninth forward gear, the torque applying upon the detaching of the shift element is comparatively low, by which the second shift element is particularly suitable for formation as a claw shift element. Since the second shift element is open in the high forward gears of eight to ten, or nine to eleven, as the case may be, a formation as a claw shift element leads to an improvement in the degree of efficiency of the transmission in such high gears, since a claw shift element in the open condition brings about drag losses that are lower than those as a frictional shift element. This is particularly relevant for the use of the transmission in a motor vehicle.

Preferably, the third planetary gear set is arranged radially within the second planetary gear set. Thereby, the need for axial installation space of the transmission is significantly reduced. This is particularly important for transmissions used in motor vehicles with front-cross drive trains.

The transmission may be a component of a drive train of a motor vehicle. The drive train features an internal combustion engine in addition to the transmission. The internal combustion engine is connected or connectable to the transmission input shaft of the transmission, either directly or through a clutch or through a hydrodynamic converter. For a reduction in the torsional vibrations, a torsional damper may be arranged in the operative connection between the internal combustion engine and the transmission input shaft.

A shaft is not to be understood solely as, for example, a cylindrical, rotatably mounted machine element for the transfer of turning moments, but hereunder also as a general connection element that connects the individual components or elements to each other, in particular a connection element that connects several elements to each other in a torque-proof manner.

A planetary gear set includes a sun gear, a carrier and a ring gear. Planetary gears, which mesh with the toothing of the sun gear and/or with the toothing of the ring gear, are rotatably mounted on the carrier. A negative gear set describes a planetary gear set with a carrier to which the planetary gears are rotatably mounted, with a sun gear and a ring gear, whereas the toothing of at least one of the planetary gears meshes with both the toothing of the sun gear and the toothing of the ring gear, by which the ring gear and the sun gear rotate in opposite directions if the sun gear is rotating with a fixed carrier.

A positive gear set differs from the negative planetary gear set described above in that the positive gear set features inner and outer planetary gears, which are rotatably mounted at the carrier. Thereby, the toothing of the inner planetary gears meshes with the toothing of the sun gear and with the toothing of the outer planetary gears. In addition, the toothing of the outer planetary gears meshes with the toothing of the ring gear. This has the consequence that, with a fixed carrier, the ring gear and the sun gear rotate in the same direction of rotation.

The stationary transmission ratio defines the rotational speed ratio between the sun gear and the ring gear of a planetary gear set with a torque-proof carrier. Since, with a negative gear set, the direction of rotation between the sun gear and the ring gear with a torque-proof carrier is reversed, the stationary transmission ratio with a negative gear set always takes a negative value.

Through shift elements, depending on the operating state, a relative movement between two components is permitted, or a connection for transferring a turning moment between the two components is established. A relative movement is to be understood, for example, as a rotation of two components, whereas the rotational speed of the first component and the rotational speed of the second component differ. In addition, the rotation of only one of the two components is also conceivable, while the other component is at a standstill or is rotating in the opposite direction.

Two elements are designated as "connected" if a fixed (in particular, a torque-proof) connection exists between the elements. Such connected elements rotate with the same rotational speed. The various components and elements of the specified invention may be connected to each other through a shaft and/or through a locked shift element or a connection element, or also directly, for example by means of a welded connection, crimped connection or another connection.

Two elements are designated as "connectable" if there is a detachable, torque-proof connection between such elements. If the connection exists, such elements rotate at the same rotational speed.

BRIEF DESCRIPTION OF THE DRAWINGS

Embodiments of the invention are described in detail below on the basis of the attached figures.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
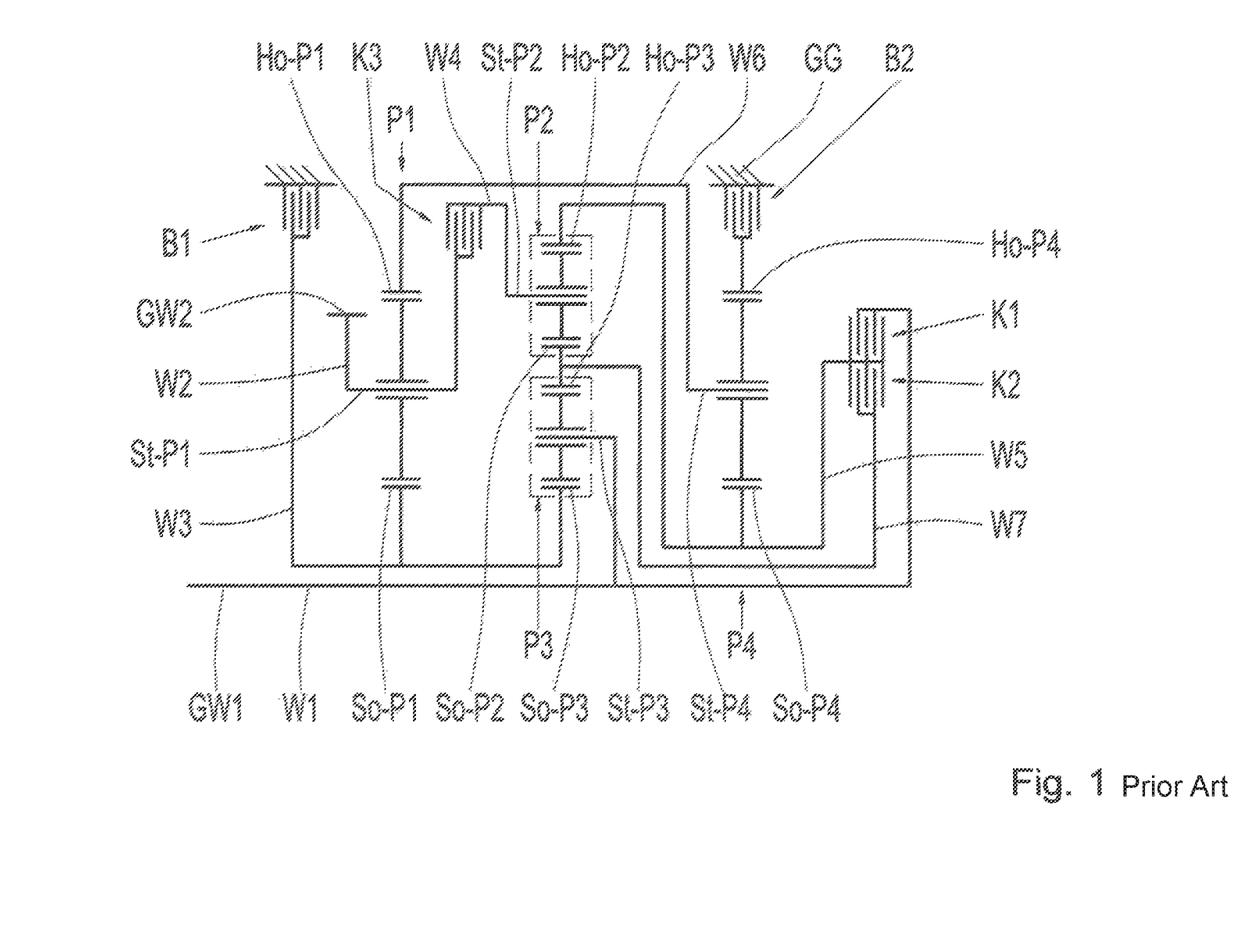
FIG. 1 schematically shows a transmission according to the state of the art.

FIG. 1 schematically shows a transmission according to the state of the art. The transmission comprises four planetary gear sets P1, P2, P3, P4, which are all formed as negative gear sets. The third planetary gear set P3 is arranged radially within the second planetary gear set P2, whereas a ring gear Ho-P3 of the third planetary gear set P3 is connected in a torque-proof manner to a sun gear So-P2 of the second planetary gear set P2 and is a component of a seventh shaft W7. A sun gear So-P3 of the third planetary gear set P3 is a component of a third shaft W3 and is connected to a sun gear So-P1 of the first planetary gear set P1. A carrier St-P3 of the third planetary gear set P3 is connected to a transmission input shaft GW1 and is a component of a first shaft W1. A carrier St-P2 of the second planetary gear set P2 is a component of a fourth shaft W4. A ring gear Ho-P2 of the second planetary gear set P2 is a component of a fifth shaft W5 and is connected to a sun gear So-P4 of the fourth planetary gear set P4. A carrier St-P1 of the first planetary gear set P1 is a component of a second shaft W2 and is connected to a transmission output shaft GW2. A ring gear Ho-P1 of the first planetary gear set P1 is a component of a sixth shaft W6 and is connected to a carrier St-P4 of the fourth planetary gear set P4.

Through a first shift element B1, the third shaft W3 is connectable in a torque-proof manner with a housing GG of the transmission or another torque-proof structural element of the transmission. Through a second shift element B2, the ring gear Ho-P4 of the fourth planetary gear set P4 can be fixed in a torque-proof manner in the same manner. Through a third shift element K1, the first shaft W1 is connectable to the fifth shaft W5, and thus also with the sun gear So-P4 of the fourth planetary gear set P4. Through a fourth shift element K2, the ring gear Ho-P2 is connectable to the sun gear So-P2 of the second planetary gear set P2. If the fourth shift element K2 is locked, the sun gear So-P2, the carrier St-P2 and the ring gear Ho-P2 of the second planetary gear set P2 rotate with same rotational speed. This state is also called the blocking of a planetary gear set. Through the fifth shift element K3, the fourth shaft W4 is connectable to the second shaft W2.

Figure 2:
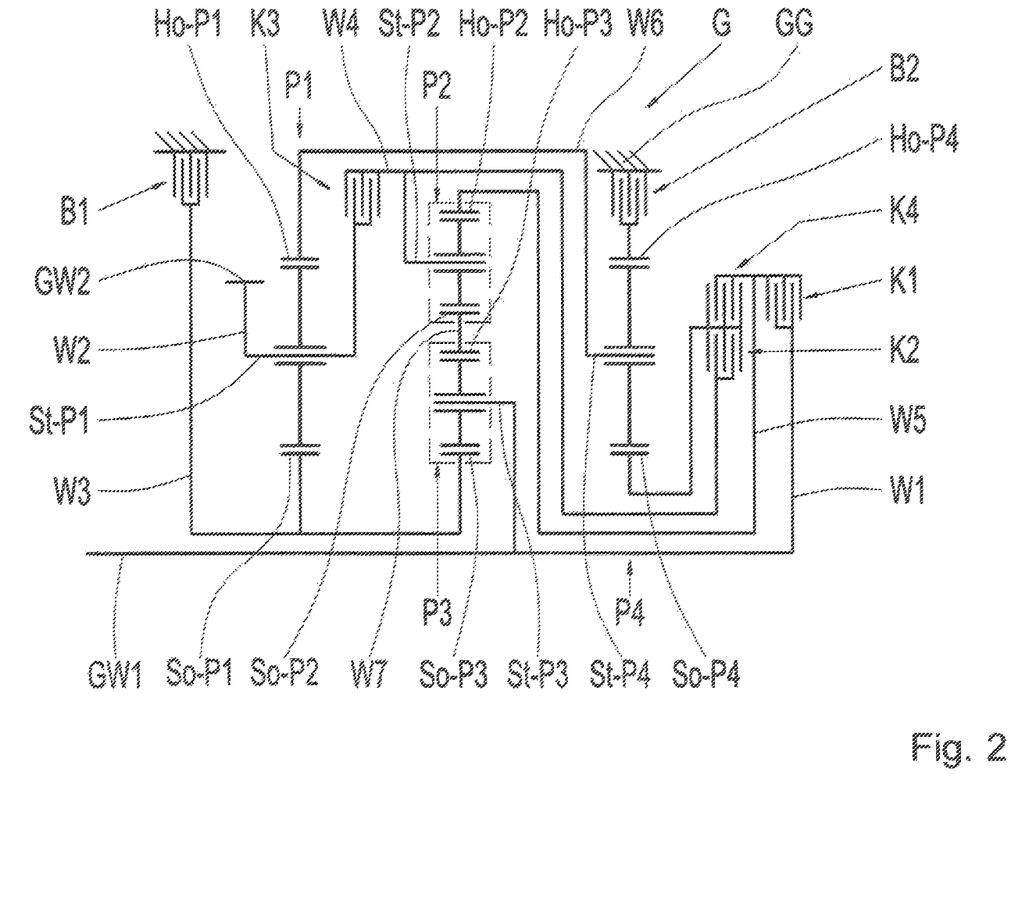
FIG. 2 schematically shows a transmission according to a first arrangement.

FIG. 2 shows a transmission G according to a first arrangement of the invention. In contrast to the transmission known in the state of the art, the fourth shaft W4 is now connected to the sun gear So-P4 of the fourth planetary gear set P4 through the fourth shift element K2. A sixth shift element K4 is arranged in the power flow between the fifth shaft W5 and the sun gear So-P4. If both the fourth shift element K2 and the sixth shift element K4 are locked, this leads to the blocking of the second planetary gear set P2. Therefore, the engagement of the fourth shift element K2 alone no longer leads to the blocking of the second planetary gear set P2. Through the third shift element K1 alone, only one connection between the first shaft W1 and the fifth shaft W5 can be established. If the third shift element K1 and the sixth shift element K4 are locked, the first shaft W1 is connected to the sun gear So-P4 of the fourth planetary gear set and the fifth shaft W5.

Figure 3:
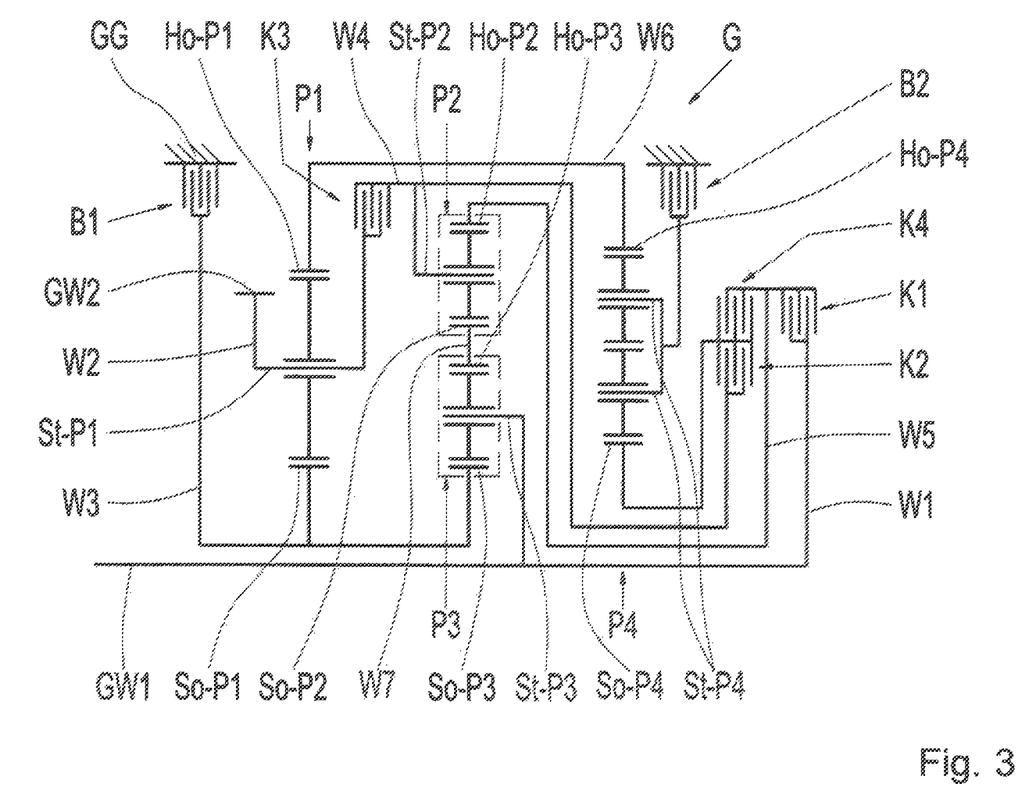
FIG. 3 schematically shows a transmission according to a second arrangement.

FIG. 3 schematically shows a transmission G according to a second arrangement of the invention. In contrast to the first arrangement, the fourth planetary gear set P4 in the second arrangement is formed as a positive gear set. Accordingly, the allocation of the shafts connected to the ring gear Ho-P4 and the carrier St-P4 of the fourth planetary gear set P4 is interchanged. The sixth shaft W6 is now connected to the ring gear Ho-P4 of the fourth planetary gear set P4, while the carrier St-P4 of the fourth planetary gear set P4 can be fixed in a torque-proof manner through the second shift element B2. If the fourth planetary gear set P4 is formed as a positive gear set, in addition to the interchange of the allocation of the ring gear and the carrier, the amount of the stationary transmission ratio is increased by the value of one, in order to achieve the same transmission ratio effect as that of the negative gear set.

Figure 4:
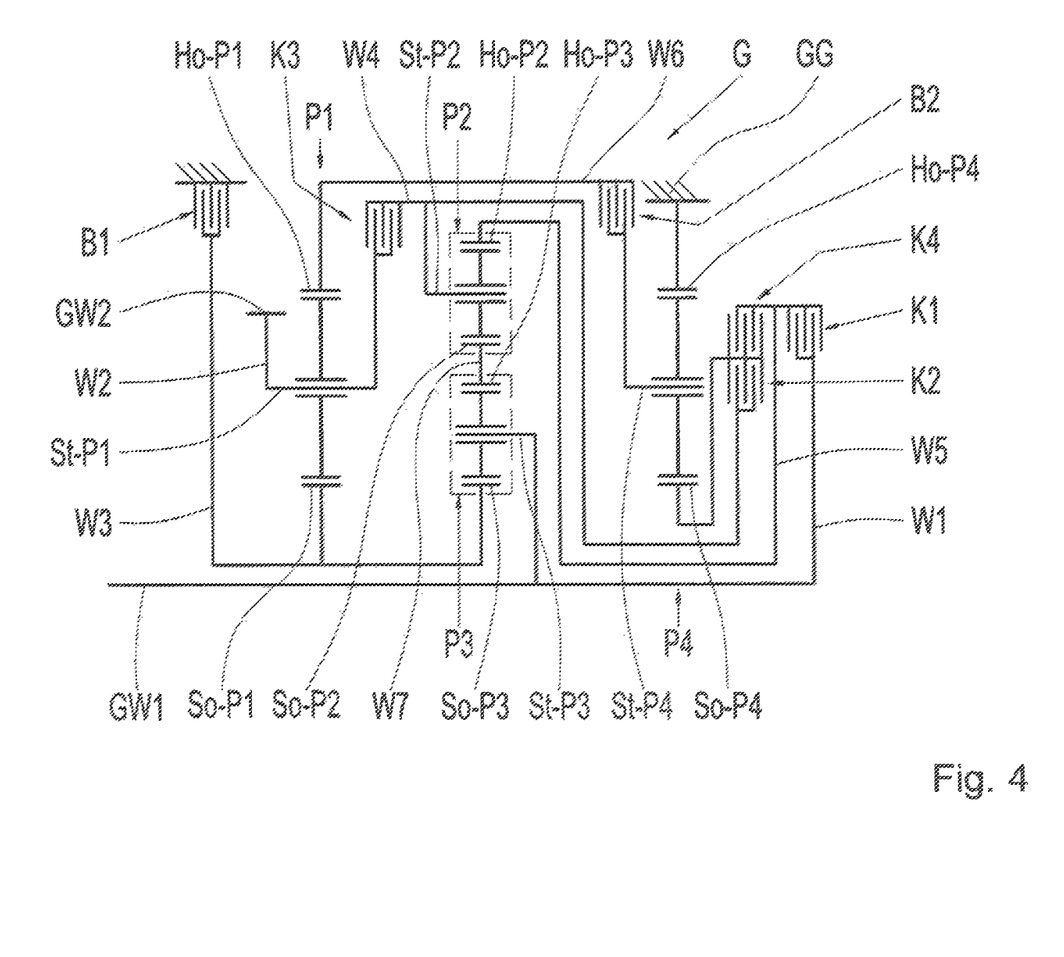
FIG. 4 schematically shows a transmission according to a third arrangement.

FIG. 4 schematically shows a transmission G according to a third arrangement of the invention. In contrast to the first arrangement, the ring gear Ho-P4 of the fourth planetary gear set P4 is permanently fixed in a torque-proof manner. In this arrangement, the second shift element B2 is arranged in the power flow between the sixth shaft W6 and the carrier St-P4 of the fourth planetary gear set P4.

Figure 5:
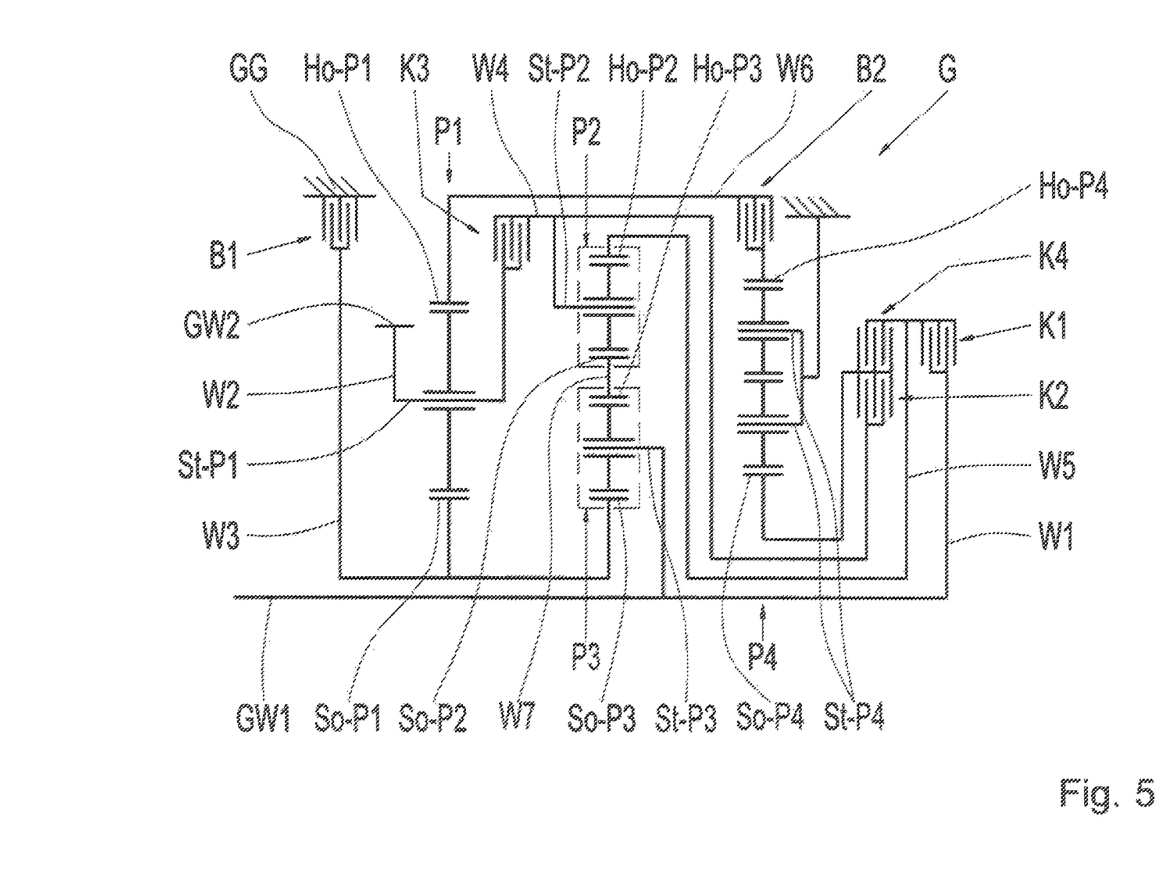
FIG. 5 schematically shows a transmission according to a fourth arrangement.

FIG. 5 schematically shows a transmission G according to a fourth arrangement of the invention. In contrast to the third arrangement, the fourth planetary gear set P4 is formed as a positive gear set. Accordingly, the second shift element B2 is now arranged in the power flow between the sixth shaft W6 and the ring gear Ho-P4 of the fourth planetary gear set P4, while the carrier St-P4 of the fourth planetary gear set P4 is permanently fixed in a torque-proof manner. The stationary transmission ratio of the fourth planetary gear set P4 is to be adjusted in a manner corresponding to the second arrangement.

Figure 6:
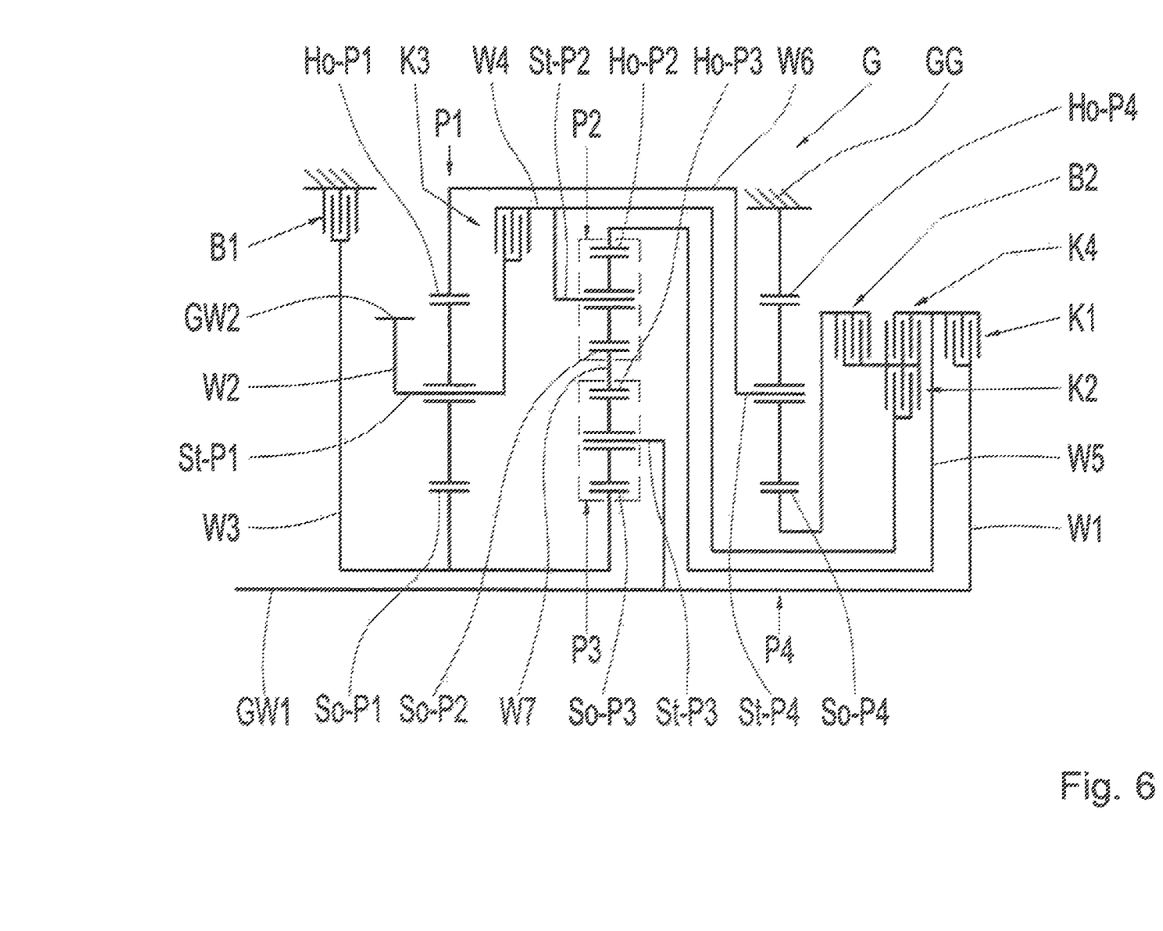
FIG. 6 schematically shows a transmission according to a fifth arrangement.

FIG. 6 schematically shows a transmission G according to a fifth arrangement of the invention. As in the third arrangement, the ring gear Ho-P4 of the fourth planetary gear set P4 is permanently fixed in a torque-proof manner in the fifth arrangement. The carrier St-P4 of the fourth planetary gear set P4 is constantly connected to the sixth shaft W6. In the fifth arrangement, the second shift element B2 is connected to the sun gear So-P4 of the fourth planetary gear set P4. If both the second shift element B2 and the fourth shift element K2 are locked, there is a torque-proof connection between the sun gear So-P4 of the fourth planetary gear set P4 and the fourth shaft W4. If both the second shift element B2 and the sixth shift element K4 are locked, there is a torque-proof connection between the sun gear So-P4 of the fourth planetary gear set P4 and the fifth shaft W5. The second shift element B2 is thus arranged in operative connection in series at the fourth shift element K2 and at the sixth shift element K4, while the fourth shift element K2 and the sixth shift element K4 are, in their operative connection, parallel to each other.

Figure 7:
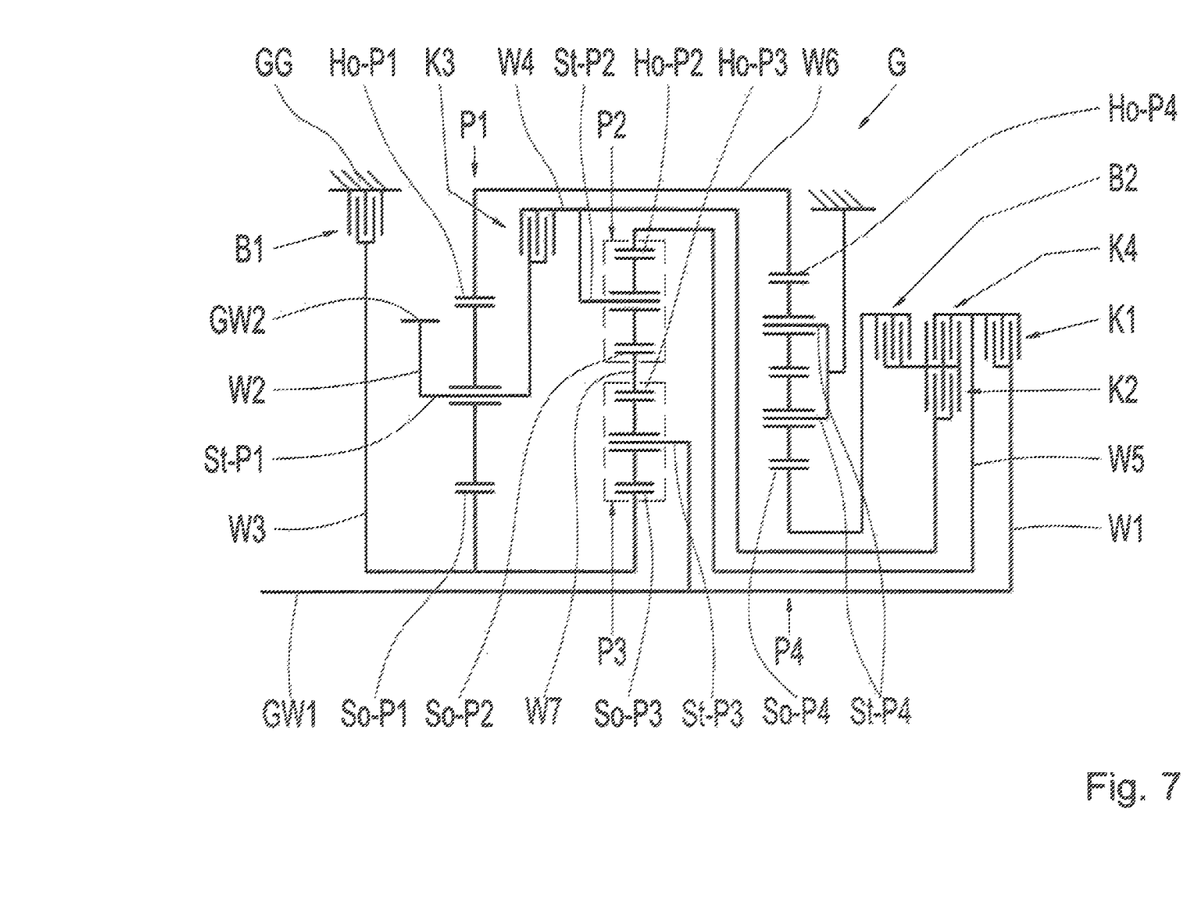
FIG. 7 schematically shows a transmission according to a sixth arrangement.

FIG. 7 schematically shows a transmission G according to a sixth arrangement of the invention. The sixth arrangement largely corresponds to the fifth arrangement; it is only the case that, in the sixth arrangement, the fourth planetary gear set P4 is formed as a positive gear set rather than as a negative gear set. The shafts allocated to the carrier St-P4 and the ring gear Ho-P4 are accordingly interchanged.

Figure 8:
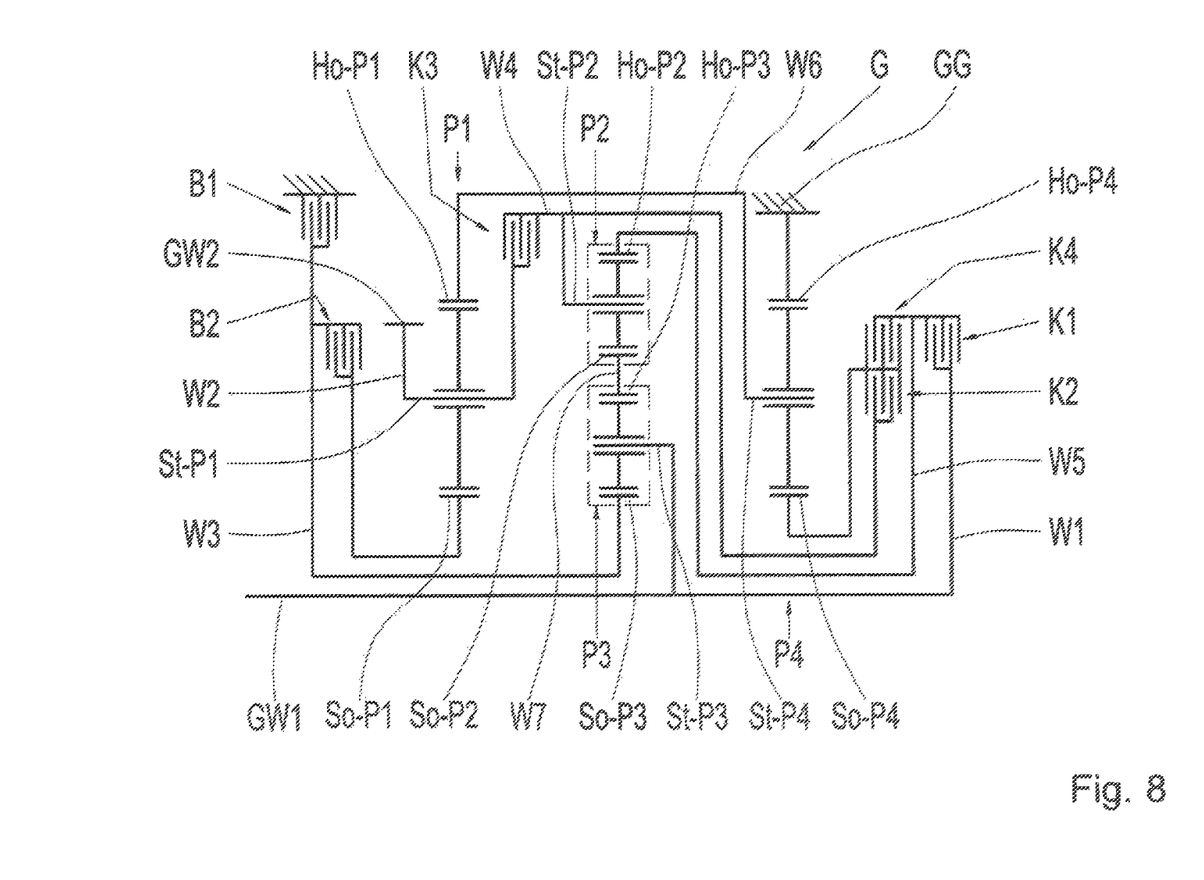
FIG. 8 schematically shows a transmission according to a seventh arrangement.

FIG. 8 schematically shows a transmission G according to a seventh arrangement of the invention. In contrast to the first through sixth arrangements, in the seventh arrangement, the sun gear So-P1 of the first planetary gear set P1 is not permanently connected to the third shaft W3. Instead, the sun gear So-P1 of the first planetary gear set P1 is connectable to the third shaft W3 through the second shift element B2.

Figure 9:
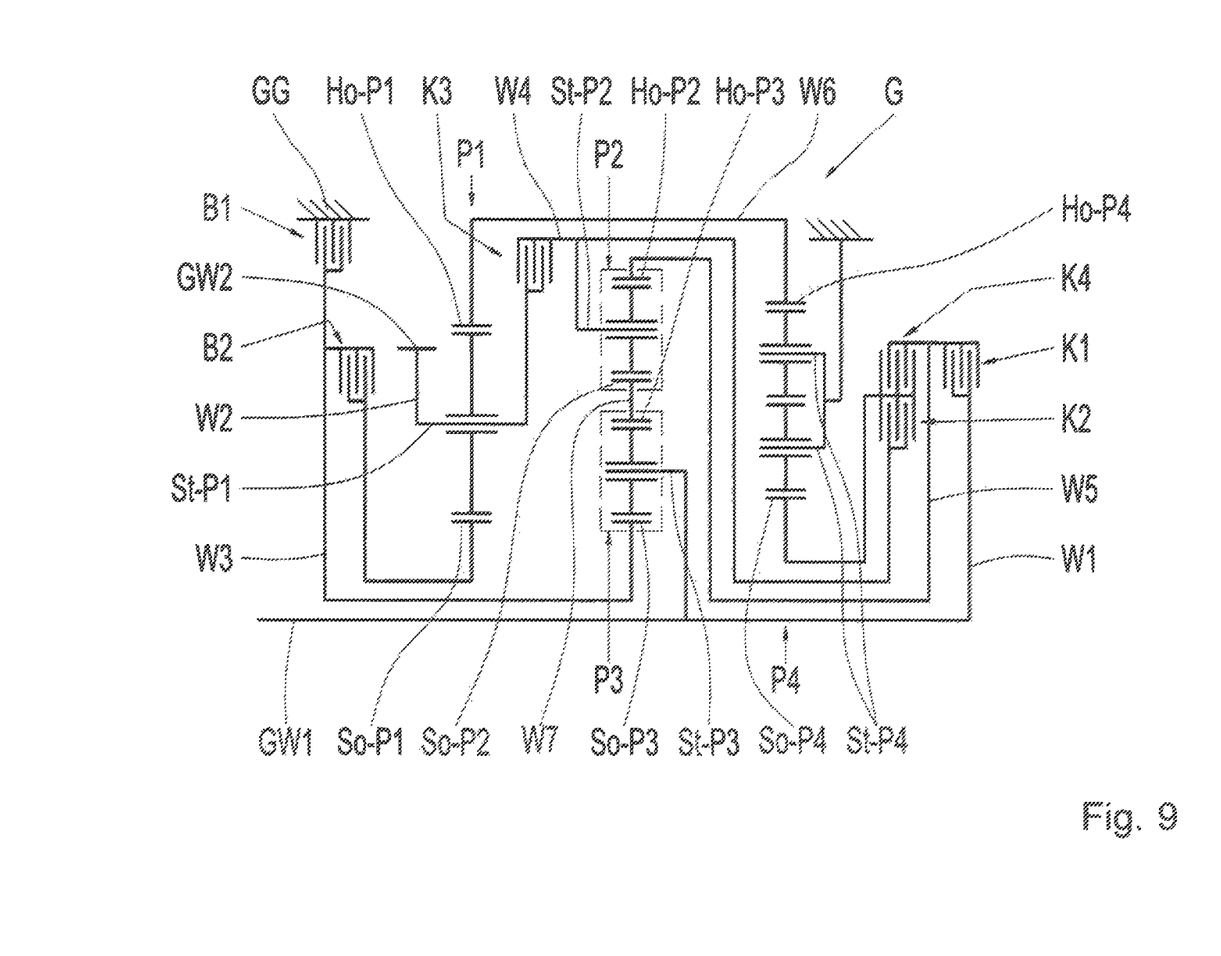
FIG. 9 schematically shows a transmission according to an eighth arrangement.

FIG. 9 schematically shows a transmission G according to an eighth arrangement of the invention. The eighth arrangement largely corresponds to the seventh arrangement; it is only the case that, in the eighth arrangement, the fourth planetary gear set P4 is formed as a positive gear set rather than as a negative gear set. The shafts allocated to the carrier St-P4 and the ring gear Ho-P4 are accordingly interchanged.

Figure 10:
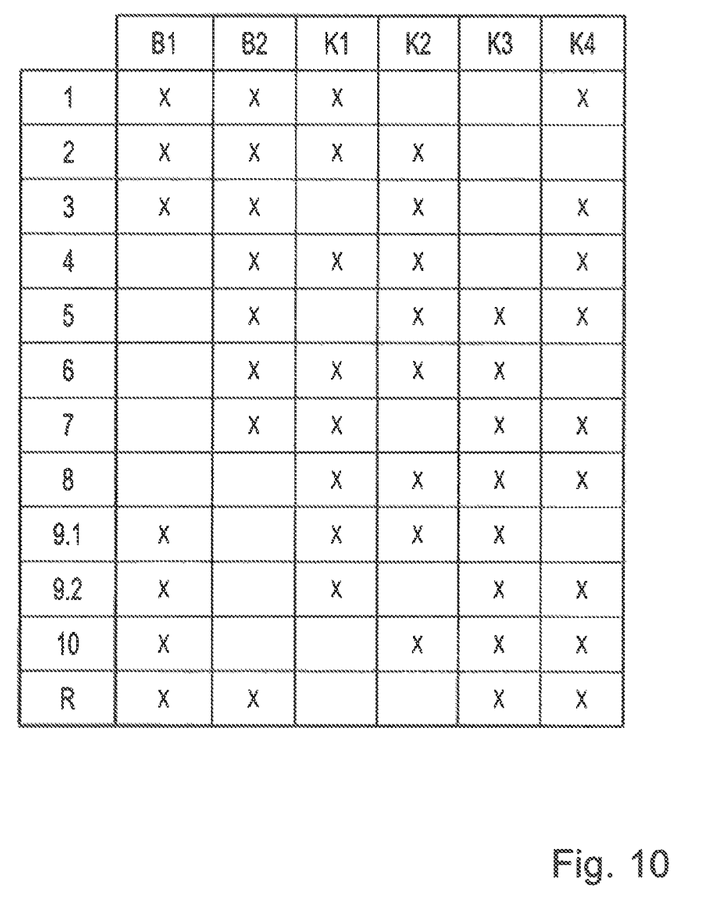
FIG. 10 shows a shifting diagram of the first to eighth arrangements of the transmission.

FIG. 10 shows a shifting diagram according to the first to eighth arrangements of the transmission G. Therein, ten forward gears 1 to 10 and one reverse gear R are indicated in the rows. In the associated columns, which of the shift elements B1, B2, K1, K2, K3, K4 that must be locked in order to form the respective gear 1-10 is represented by an X.

The first forward gear 1 is formed through the engagement of the first shift element B1, the second shift element B2, the third shift element K1 and the sixth shift element K4. The second forward gear 2 is formed through the engagement of the first shift element B1, the second shift element B2, the third shift element K1 and the fourth shift element K2. The third forward gear 3 is formed through the engagement of the first shift element B1, the second shift element B2, the fourth shift element K2 and the sixth shift element K4. The fourth forward gear 4 is formed through the engagement of the second shift element B2, the third shift element K1, the fourth shift element K2 and the sixth shift element K4. The fifth forward 5 is formed through the engagement of the second shift element B2, the fourth shift element K2, the fifth shift element K3 and the sixth shift element K4. The sixth forward gear 6 is formed through the engagement of the second shift element B2, the third shift element K1, the fourth shift element K2 and the fifth shift element K3. The seventh forward gear 7 is formed through the engagement of the second shift element B2, the third shift element K1, the fifth shift element K3 and the sixth shift element K4. The eighth forward gear 8 is formed through the engagement of the third shift element K1, the fourth shift element K2, the fifth shift element K3 and the sixth shift element K4. For the formation of the ninth forward gear, there are two kinematically equivalent variants 9.1, 9.2. The first variant 9.1 of the ninth forward gear is formed through the engagement of the first shift element B1, the third shift element K1, the fourth shift element K2 and the fifth shift element K3. The second variant 9.2 of the ninth forward gear is formed through the engagement of the first shift element B1, the third shift element K1, the fifth shift element K3 and the sixth shift element K4. The tenth forward gear 10 is formed through the engagement of the first shift element B1, the fourth shift element K2, the fifth shift element K3 and the sixth shift element K4. The reverse gear R is formed through the engagement of the first shift element B1, the second shift element B2, the fifth shift element K3 and the sixth shift element K4.

Figure 11:
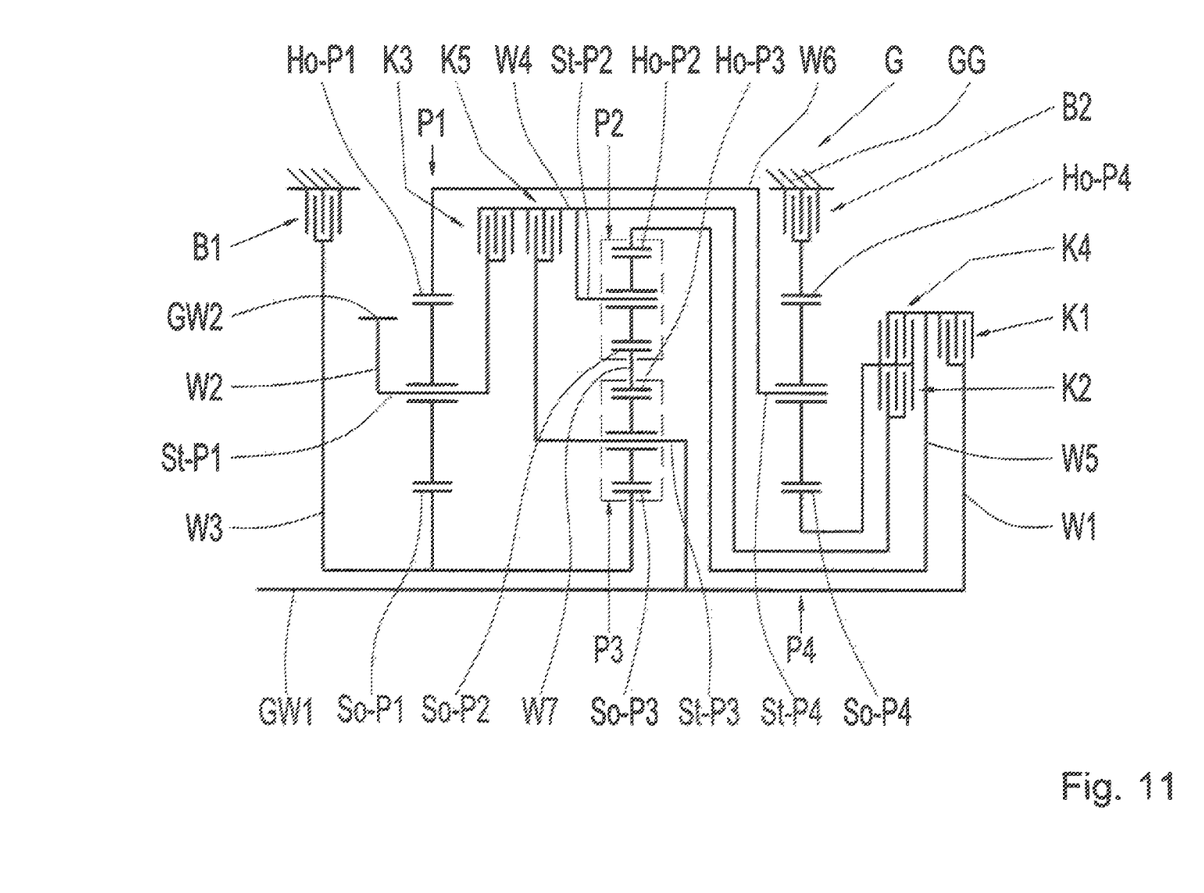
FIG. 11 schematically shows a transmission according to a ninth arrangement.

FIG. 11 schematically shows a transmission G according to a ninth arrangement of the invention. In this ninth arrangement, the transmission G features a seventh shift element K5. Through the seventh shift element K5, the first shaft W1 is connectable to the fourth shaft W4.

Figure 12:
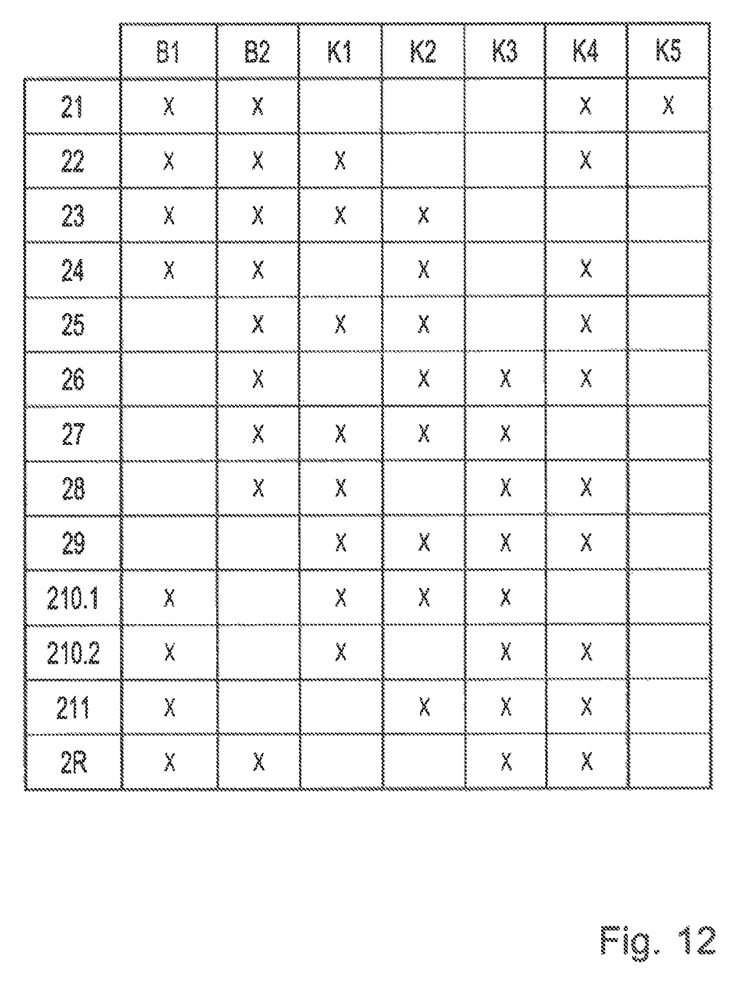
FIG. 12 shows a shifting diagram according to the ninth arrangement of the transmission.

FIG. 12 shows a schematic diagram of the transmission G according to the ninth arrangement of the invention. Eleven forward gears 21 to 211 along with one reverse gear 2R are indicated in the rows. In the associated columns, which of the shift elements B1, B2, K1, K2, K3, K4, K5 must be locked in order to form the respective gear 21-211, 2R is represented by an X. The first forward gear 21 is formed through the engagement of the first shift element B1, the second shift element B2, the sixth shift element K4 and the seventh shift element K5. The formation of the second to eleventh forward gears 22-211 in the ninth arrangement corresponds to the formation of the first to tenth forward gears 1-10 of the first through eighth arrangements, whereas the seventh shift element K5 is open in the second to eleventh forward gears 21-211. The formation of the reverse gear 2R of the ninth arrangement is identical to the formation of the reverse gear R in the first to eighth arrangements, whereas the seventh shift element K5 is open in the reverse gear 2R.

Modifications and variations can be made to the embodiments illustrated or described herein without departing from the scope and spirit of the invention as set forth in the appended claims.

REFERENCE SIGNS

G Transmission
GG Transmission housing
GW1 Transmission input shaft
GW2 Transmission output shaft
B1 First shift element
B2 Second shift element
K1 Third shift element
K2 Fourth shift element
K3 Fifth shift element
K4 Sixth shift element
K5 Seventh shift element
P1 First planetary gear set
P2 Second planetary gear set
P3 Third planetary gear set
P4 Fourth planetary gear set
So-P1 Sun gear of the first planetary gear set
St-P1 Carrier of the first planetary gear set
Ho-P1 Ring gear of the first planetary gear set
So-P2 Sun gear of the second planetary gear set
St-P2 Carrier of the second planetary gear set
Ho-P2 Ring gear of the second planetary gear set
So-P3 Sun gear of the third planetary gear set
St-P3 Carrier of the third planetary gear set
Ho-P3 Ring gear of the third planetary gear set
So-P4 Sun gear of the fourth planetary gear set
St-P4 Carrier of the fourth planetary gear set
Ho-P4 Ring gear of the fourth planetary gear set
W1 First shaft
W2 Second shaft
W3 Third shaft
W4 Fourth shaft
W5 Fifth shaft
W6 Sixth shaft
W7 Seventh shaft
1-10 First to tenth forward gears
21-211 First to eleventh forward gears
R/2R Reverse gear

The invention claimed is:

1. A transmission (G), comprising:
first, second, third and fourth planetary gear sets (P1, P2, P3, P4), first, second, third, fourth, fifth, and sixth, and seventh shafts (W1-W7), and first, second, third, fourth and fifth shift elements (B1, B2, K1, K2, K3), wherein selective engagement of the shift elements brings about different transmission ratio relationships between a transmission input shaft (GW1) and a transmission output shaft (GW2);
the first shaft (W1) connected to the transmission input shaft (GW1) and to a carrier (St-P3) of the third planetary gear set (P3);
the second shaft (W2) connected to the transmission output shaft (GW2) and to a carrier (St-P1) of the first planetary gear set (P1);
the third shaft (W3) connected to a sun gear (So-P3) of the third planetary gear set (P3) and fixable in a torque-proof manner, through engagement of the first shift element (B1), to a housing (GG) of the transmission;
the fourth shaft (W4) connected to a carrier (St-P2) of the second planetary gear set (P2);
the fifth shaft (W5) connected to a ring gear (Ho-P2) of the second planetary gear set (P2);
the sixth shaft (W6) connected to a ring gear (Ho-P1) of the first planetary gear set (P1);
a ring gear (Ho-P3) of the third planetary gear set (P3) connected in a torque-proof manner to a sun gear (So-P2) of the second planetary gear set (P2);
the first shaft (W1) connectable, through engagement of the third shift element (K1), with the fifth shaft (W5);
the second shaft (W2) connectable, through the engagement of the fifth shift element (K3), with the fourth shaft (W4);
a sixth shift element (K4), through which the fifth shaft (W5) is connectable to the sun gear (So-P4) of the fourth planetary gear set (P4), either directly through engagement of the sixth shift element (K4) or through engagement of the second shift element (B2) and the sixth shift element (K4); and
the fourth shaft (W4) connectable through the fourth shift element (K2) with the sun gear (So-P4) of the fourth planetary gear set (P4), either directly through engagement of the fourth shift element (K2) or through engagement of the second shift element (B2) and the fourth shift element (K2).

2. The transmission (G) according to claim 1, wherein the fourth planetary gear set (P4) is one of a negative gear set such that
the carrier (St-P4) of the fourth planetary gear set (P4) is connected to the sixth shaft (W6), and the ring gear (Ho-P4) of the fourth planetary gear set (P4) is fixable in a torque-proof manner, through engagement of the second shift element (B2), with the housing (GG) of the transmission;
a sun gear (So-P1) of the first planetary gear set (P1) is connected to the third shaft (W3); and
the fifth shaft (W5) is connectable to the sun gear (So-P4) of the fourth planetary gear set (P4) through engagement of the sixth shift element (K4).

3. The transmission (G) according to claim 1, wherein the fourth planetary gear set (P4) is one of a positive gear set, such that
the ring gear (Ho-P4) of the fourth planetary gear set (P4) is connected to the sixth shaft (W6), and the carrier (St-P4) of the fourth planetary gear set is fixable in a torque-proof manner, through engagement of the second shift element (B2), with the housing (GG) of the transmission;
a sun gear (So-P1) of the first planetary gear set (P1) is connected to the third shaft (W3); and
the fifth shaft (W5) is connectable to the sun gear (So-P4) of the fourth planetary gear set (P4) through engagement of the sixth shift element (K4).

4. The transmission (G) according to claim 1, wherein the fourth planetary gear set (P4) is one of a negative gear set, such that
the carrier (St-P4) of the fourth planetary gear set (P4) is connectable, through engagement of the second shift element (B2), with the sixth shaft (W6), and the ring gear (Ho-P4) of the fourth planetary gear set (P4) is fixed in a torque-proof manner with the housing (GG) of the transmission;
a sun gear (So-P1) of the first planetary gear set (P1) is connected to the third shaft (W3); and
the fifth shaft (W5) is connectable to the sun gear (So-P4) of the fourth planetary gear set (P4) through engagement of the sixth shift element (K4).

5. The transmission (G) according to claim 1, wherein the fourth planetary gear set (P4) is one of a positive gear set, such that
the ring gear (Ho-P4) of the fourth planetary gear set is connectable, through engagement of the second shift element (B2), with the sixth shaft (W6), and the carrier (St-P4) of the fourth planetary gear set (P4) is fixed in a torque-proof manner with the housing (GG) of the transmission;
a sun gear (So-P1) of the first planetary gear set (P1) is connected to the third shaft (W3); and
the fifth shaft (W5) is connectable to the sun gear (So-P4) of the fourth planetary gear set (P4) through engagement of the sixth shift element (K4).

6. The transmission (G) according to claim 1, wherein:
the fifth shaft (W5) is connectable to the sun gear (So-P4) of the fourth planetary gear set (P4) through engagement of the second shift element (B2) and the sixth shift element (K4);
the fourth shaft (W4) is connectable to the sun gear (So-P4) of the fourth planetary gear set through engagement of the fourth shift element (K2) and the second shift element (B2);
a sun gear (So-P1) of the first planetary gear set (P1) is connected to the third shaft (W3); and
the fourth planetary gear set (P4) is one of a negative gear set, such that the carrier (St-P4) of the fourth planetary gear set (P4) is connected to the sixth shaft (W6), and the ring gear (Ho-P4) of the fourth planetary gear set (P4) is fixed in a torque-proof manner with the housing (GG) of the transmission.

7. The transmission (G) according to claim 1, wherein:
the fifth shaft (W5) is connectable to the sun gear (So-P4) of the fourth planetary gear set (P4) through engagement of the second shift element (B2) and the sixth shift element (K4);
the fourth shaft (W4) is connectable to the sun gear (So-P4) of the fourth planetary gear set through engagement of the fourth shift element (K2) and the second shift element (B2);
a sun gear (So-P1) of the first planetary gear set (P1) is connected to the third shaft (W3); and
the fourth planetary gear set (P4) is one of a positive gear set, such that the ring gear (Ho-P4) of the fourth planetary gear set (P4) is connected to the sixth shaft (W6), and the carrier (St-P4) of the fourth planetary gear set (P4) is fixed in a torque-proof manner with the housing (GG) of the transmission.

8. The transmission (G) according to claim 1, wherein:
a sun gear (So-P1) of the first planetary gear set (P1) is connectable to the third shaft (W3) through engagement of the second shift element (B2);
the fifth shaft (W5) is connectable to the sun gear (So-P4) of the fourth planetary gear set (P4) through engagement of the sixth shift element (K4); and
the fourth planetary gear set (P4) is one of a negative gear set, such that the carrier (St-P4) of the fourth planetary gear set (P4) is connected to the sixth shaft (W6), and the ring gear (Ho-P4) of the fourth planetary gear set (P4) is fixed in a torque-proof manner with the housing (GG) of the transmission.

9. The transmission (G) according to claim 1, wherein:
a sun gear (So-P1) of the first planetary gear set (P1) is connectable to the third shaft (W3) through engagement of the second shift element (B2);
the fifth shaft (W5) is connectable to the sun gear (So-P4) of the fourth planetary gear set (P4) through engagement of the sixth shift element (K4); and
the fourth planetary gear set (P4) is one of a positive gear set, such that the ring gear (Ho-P4) of the fourth planetary gear set (P4) is connected to the sixth shaft (W6), and the carrier (St-P4) of the fourth planetary gear set (P4) is fixed in a torque-proof manner with the housing (GG) of the transmission.

10. The transmission (G) according to claim 1, wherein the transmission (G) features ten forward gears (1-10), and:
a first forward gear (1) of the ten forward gears arises through engagement of the first shift element (B1), the second shift element (B2), the third shift element (K1) and the sixth shift element (K4);
a second forward gear (2) of the ten forward gears arises through engagement of the first shift element (B1), the second shift element (B2), the third shift element (K1) and the fourth shift element (K2);
a third forward gear (3) of the ten forward gears arises through engagement of the first shift element (B1), the second shift element (B2), the fourth shift element (K2) and the sixth shift element (K4);
a fourth forward gear (4) of the ten forward gears arises through engagement of the second shift element (B2), the third shift element (K1), the fourth shift element (K2) and the sixth shift element (K4);
a fifth forward gear (5) of the ten forward gears arises through engagement of the second shift element (B2), the fourth shift element (K2), the fifth shift element (K3) and the sixth shift element (K4);
a sixth forward gear (6) of the ten forward gears arises through engagement of the second shift element (B2), the third shift element (K1), the fourth shift element (K2) and the fifth shift element (K3);

a seventh forward gear (7) of the ten forward gears arises through engagement of the second shift element (B2), the third shift element (K1), the fifth shift element (K3) and the sixth shift element (K4);

an eighth forward gear (8) of the ten forward gears arises through engagement of the third shift element (K1), the fourth shift element (K2), the fifth shift element (K3) and the sixth shift element (K4);

a ninth forward gear (9.1, 9.2) of the ten forward gears arises either through engagement of the first shift element (B1), the third shift element (K1), the fourth shift element (K2) and the fifth shift element (K3), or through engagement of the first shift element (B1), the third shift element (K1), the fifth shift element (K3) and the sixth shift element (K4); and a tenth forward gear (10) of the ten forward gears arises through engagement of the first shift element (B1), the fourth shift element (K2), the fifth shift element (K3) and the sixth shift element (K4).

11. The transmission (G) according to claim 10, wherein, in each forward gear of the transmission (G), four of the six shift elements (B1, B2, K1, K2, K3, K4) are engaged.

12. The transmission (G) according to claim 1, wherein the transmission (G) comprises a seventh shift element (K5), through engagement of the seventh shift element, the first shaft (W1) is connectable to the fourth shaft (W4).

13. The transmission (G) according to claim 12, wherein the seventh shift element (K5) is formed as a claw shift element or a synchronization shift element.

14. The transmission (G) according to claim 12, wherein the transmission (G) features eleven forward gears (21-211), and:

a first forward gear (21) of the eleven forward gears arises through engagement of the first shift element (B1), the second shift element (B2), the sixth shift element (K4) and the seventh shift element (K5);

a second forward gear (22) of the eleven forward gears arises through engagement of the first shift element (B1), the second shift element (B2), the third shift element (K1) and the sixth shift element (K4);

a third forward gear (23) of the eleven forward gears arises through engagement of the first shift element (B1), the second shift element (B2), the third shift element (K1) and the fourth shift element (K2);

a fourth forward gear (24) of the eleven forward gears arises through engagement of the first shift element (B1), the second shift element (B2), the fourth shift element (K2) and the sixth shift element (K4);

a fifth forward gear (25) of the eleven forward gears arises through the engagement of the second shift element (B2), the third shift element (K1), the fourth shift element (K2) and the sixth shift element (K4);

a sixth forward gear (26) of the eleven forward gears arises through the engagement of the second shift element (B2), the fourth shift element (K2), the fifth shift element (K3) and the sixth shift element (K4);

a seventh forward gear (27) of the eleven forward gears arises through the engagement of the second shift element (B2), the third shift element (K1), the fourth shift element (K2) and the fifth shift element (K3);

an eighth forward gear (28) of the eleven forward gears arises through the engagement of the second shift element (B2), the third shift element (K1), the fifth shift element (K3) and the sixth shift element (K4);

a ninth forward gear (29) of the eleven forward gears arises through the engagement of the third shift element (K1), the fourth shift element (K2), the fifth shift element (K3) and the sixth shift element (K4);

a tenth forward gear (210.1, 210.2) of the eleven forward gears arises through the engagement of the first shift element (B1), the third shift element (K1), the fourth shift element (K2) and the fifth shift element (K3), or through engagement of the first shift element (B1), the third shift element (K1), the fifth shift element (K3) and the sixth shift element (K4); and an eleventh forward gear (211) of the eleven forward gears arises through engagement of the first shift element (B1), the fourth shift element (K2), the fifth shift element (K3) and the sixth shift element (K4).

15. The transmission (G) according to claim 14 wherein, in each forward gear of the transmission (G), four of the seven shift elements (B1, B2, K1, K2, K3, K4, K5) are engaged.

16. The transmission (G) according to claim 1, wherein the second shift element (B2) is formed as a claw shift element or a synchronization element.

17. The transmission (G) according to claim 1, wherein the transmission (G) comprises a reverse gear (R, 2R) formed through engagement of the first shift element (B1), the second shift element (B2), the fifth shift element (K3) and the sixth shift element (K4).

18. The transmission (G) according to claim 1, wherein the third planetary gear set (P3) is arranged radially within the second planetary gear set (P2).

19. A drive train for a motor vehicle comprising the transmission (G) according to claim 1.

* * * * *